United States Patent
Lin et al.

(10) Patent No.: US 8,527,536 B2
(45) Date of Patent: Sep. 3, 2013

(54) METHOD AND SYSTEM FOR QUICKLY RETRIEVING INFORMATION SERVICE ON MOBILE TERMINAL

(75) Inventors: Yu Lin, Beijing (CN); Jiong Du, Beijing (CN); Shihong Zou, Beijing (CN)

(73) Assignee: Netqin Mobile (Beijing) Technology, Co., Ltd., Beijing (CN)

( * ) Notice: Subject to any disclaimer, the term of this patent is extended or adjusted under 35 U.S.C. 154(b) by 0 days.

(21) Appl. No.: 12/865,637

(22) PCT Filed: Jan. 24, 2009

(86) PCT No.: PCT/CN2009/070320
§ 371 (c)(1),
(2), (4) Date: Apr. 19, 2011

(87) PCT Pub. No.: WO2009/097815
PCT Pub. Date: Aug. 13, 2009

(65) Prior Publication Data
US 2011/0184971 A1    Jul. 28, 2011

(30) Foreign Application Priority Data
Feb. 1, 2008  (CN) .......................... 2008 1 0057370

(51) Int. Cl.
G06F 17/30    (2006.01)
(52) U.S. Cl.
USPC .......................................... 707/769; 707/770
(58) Field of Classification Search
USPC ................................................... 707/769–770
See application file for complete search history.

(56) References Cited

U.S. PATENT DOCUMENTS

| | | | |
|---|---|---|---|
| 5,809,415 A * | 9/1998 | Rossmann | 455/422.1 |
| 6,445,932 B1 * | 9/2002 | Soini et al. | 455/556.1 |
| 6,463,304 B2 * | 10/2002 | Smethers | 455/566 |
| 6,781,575 B1 * | 8/2004 | Hawkins et al. | 345/173 |
| 7,013,130 B2 * | 3/2006 | Ku | 455/414.2 |
| 7,337,910 B2 * | 3/2008 | Cartmell et al. | 209/245 |
| 7,644,121 B2 * | 1/2010 | Swanson et al. | 709/203 |
| 7,707,224 B2 * | 4/2010 | Chastagnol et al. | 707/783 |
| 7,715,371 B2 * | 5/2010 | Low et al. | 370/352 |
| 7,849,135 B2 * | 12/2010 | Agrawal et al. | 709/204 |
| 8,095,190 B2 * | 1/2012 | Kim | 455/575.1 |
| 2002/0059457 A1 * | 5/2002 | Ballard et al. | 709/246 |
| 2002/0188575 A1 * | 12/2002 | Freeny, Jr. | 705/72 |
| 2003/0040327 A1 * | 2/2003 | Park | 455/466 |
| 2003/0208472 A1 * | 11/2003 | Pham | 707/2 |
| 2007/0074024 A1 * | 3/2007 | Cheong et al. | 713/171 |
| 2008/0009268 A1 * | 1/2008 | Ramer et al. | 455/412.1 |
| 2009/0006256 A1 * | 1/2009 | Lazovsky et al. | 705/57 |
| 2009/0125387 A1 * | 5/2009 | Mak et al. | 705/14 |
| 2010/0063892 A1 * | 3/2010 | Keronen et al. | 705/26 |

OTHER PUBLICATIONS

PCT/CN2009/070320, May 7, 2009, International Search Report.

* cited by examiner

*Primary Examiner* — Hanh Thai
(74) *Attorney, Agent, or Firm* — Baker & McKenzie LLP

(57) ABSTRACT

A method and system for quickly retrieving the information service on a mobile terminal, adopt the structure of client/server. The method comprises: the user is directly interactive with a server and retrieves the information service via the client module bound at the terminal; the user directly enters a keyword on the desktop of the terminal; the client module queries the client database, server-side database and server-side searching device respectively, based on the present service mode and the information entered by the user, obtains the corresponding network service and content resource, and selects the relevant network as the service carrier based on the service mode, directs the user to enter these network resources to obtain the information service directly.

16 Claims, 10 Drawing Sheets

METHOD AND SYSTEM FOR QUICKLY RETRIEVING INFORMATION SERVICE ON MOBILE TERMINAL

TECHNICAL FIELD

The invention relates to technical field of mobile communication and computer communication, particularly relates to a method and system for quickly retrieving information service on mobile terminal.

BACKGROUND OF THE INVENTION

Currently information services available on mobile terminal have covered wireless network, internet and telephone network, etc. More and more provided with PC functions, intelligent mobile terminal has gradually integrated functions of net surfing, audio/video playing, photographing and camera shooting, besides calling function, and new functions such like mobile television, mobile payment also gradually become common in mobile terminal, with development of wireless network and mobile terminal. However, due to restriction of keyboard, screen and operation method of mobile terminal, users meet many problems such as inconveniently inputting link address with keyboard, complex operations of obtaining network services of net surfing and searching, incapable of obtaining service of vague phone querying, etc, when using intelligent terminal.

Taking access to the internet with mobile phone as an example, under standby state of mobile phone desktop, generally only number key can be input from keyboard, then by pressing dialing key can connect to telephone network to dial phone terminal of corresponding number. But the desktop design mode is very inconvenient for users to access to the internet, WAP network, and to use searching and vague phone querying services. Taking Nokia N70 as an example, if users want to entry SINA wireless WAP site with its domain name as "3g.sina.com.cn", first users must enter into function interface from phone desktop, then click icon of "network", after WAP browser loaded, users still need to input "3g.sina.com.cn" in the browser, then can visit the WAP site. The above operation procedures are difficult for many users, and these problems may exist: unclear of procedures of the operation, cannot remember the domain name "3g.sina.com.cn" of SINA wireless network, operation of inputting "3g.sina.com.cn" form keyboard being complex and inconvenient, which are obstacles for users to access to the internet with mobile phone.

For application of searching with mobile phone, current application of searching with mobile phone generally requires users to entry WAP site or WEB site of phone searching, and then searching requirement can be submitted. The above similar reasons cause much trouble for users to obtain searching services. In addition, currently there are some SMS searching technologies, i.e. through SMS users sending keywords to SMS searching platform which feedback to users after obtaining results also through SMS, which style has the disadvantage: users often cannot remember SMS special service number of SMS searching platform, causing application and development of the business not very well.

Moreover, during using mobile phone, the situation may often be met: users need to dial number of certain units, such as tickets booking telephone of "CTRIP" which is not stored in users' address list, upon which users generally query through 114 or find the number with searching engineer searching on the internet using mobile phone. But sometimes the returned results when querying with 114 are not accurate, especially when the number needs to be queried is not local, users need to dial the local 114 to query, which cost expensively for users; and searching the internet with mobile phone requires users to masterly use mobile phone, and the querying process costs some time, and sometimes cannot search correct result, sometimes return many invalid results, which still requires users to filter among them. And even if users obtain the phone number with the above method, users need to record it down with pen, and then dial it with mobile phone, finally can dial the number. The whole operation process is very fussy and inconvenient.

It can be seen through the above analysis, the current technique cannot solve problems of quickly retrieving information services of internet, WAP network, searching, vague phone querying on mobile terminal desktop.

SUMMARY OF THE INVENTION

In view of this, the invention intends to provide a method and system for quickly retrieving information service on mobile terminal, which solves a plurality of problems which are present when realizing direct access to the internet, searching, vague phone querying and dialing in standby desktop of mobile phone, simplifying operations of obtaining network services on mobile terminal, facilitating users to rapidly and conveniently access to the internet and WAP net, quickly retrieving searching service, and communication services of easily querying unknown phone number and dialing directly. Because the above operations are implemented on desktop and without remembering domain name, the invention can highly increase convenience of users' using mobile terminal, and completely improve users' feeling of using mobile phone.

To achieve the purpose, the invention provides a method for quickly retrieving information service on mobile terminal, which applies system structure of client/server, and according to current service mode and input information of users, through querying client database, server database or searching the internet by the server searching device, client module of mobile terminal obtains corresponding service and content resources.

According to the above method for obtaining information service, when the mobile terminal is in standby state, by clicking a mode switch key, users can directly change standby state of the mobile terminal into a different service mode, or make switch between different service modes, and in each service mode, users can directly input information on the mobile terminal desktop. The mode switch key includes keyboard key and soft key displayed in screen, or can be extensively defined as a certain voice input instruction or handwriting input instruction.

According to the above method for obtaining information service, concrete operations performed by client module of the mobile terminal in accordance with current service and input information of users are: First, retrieving client database, to judge if related information can be queried, if it can be queried, directly returning information to users, and providing corresponding service to users; if related information being not queried in client database, client module connecting with server, and uploading information to the server according to information uploading method, making the server query server database, and if related information being queried in the server database, returning the queried result to the client module by following information returning method; if related information being not queried in the server database, server starting server searching device to perform search on basis of the internet and wireless network, and returning retrieval result to client module according to information returning method; and when obtaining related returning result, client module displaying it to users, so that users can perform subsequent operation.

According to the above method for obtaining information service, processing procedures after mobile terminal switches to intelligent net surfing service mode include the following operations: users inputting information, and clicking service starting key; client module first judging whether input information of users is legal link address or not, if yes, client module starting browser and opening corresponding website; if input information of users being not legal link address, client module retrieving client database, and if related website result being retrieved, returning the website result; if related website result being not retrieved in client database, client module uploading information to server, on basis of the uploaded information server querying server database, and if related website result being retrieved in the server database, server returning the website result to client module; if no related website result being retrieved in the server database, server starting searching device, searching with the input content of users as keyword, and returning the searched website result to client module; if the searching apparatus also searching no related result, server sending prompting message, reminding users to input information again; and client module displaying returned website result, for users' confirmation to open related website.

According to the above method for obtaining information service, processing procedures after the mobile terminal switches to intelligent searching service mode include the following operations: users inputting information, and clicking service starting key; client module retrieving the client database according to input information of users, if related result being retrieved, returning the retrieval result; if related result being not retrieved in the client database, the client module starting browser, opening searching website to search; the searching website searching according to input information of users, and returning relate searched result to client module; and client module displaying the searched result.

According to the above method for obtaining information service, processing procedures after mobile terminal switches to vague phone yellow pages mode include the following operations: users inputting information, and clicking service starting key; client module first judging whether input information of users is legal phone number, if yes, the client module directly dialing the number; if the input information of users is not legal phone number, client module retrieving local database, if related result being retrieved in the client database, returning the result; if related result being not retrieved in client database, the client module uploading information to server, on basis of the uploaded information server querying server database, and if related result being retrieving in the server database, server returning the result to client module; if related result being not retrieved in the server database, server starting searching device, searching the internet with the input content of users as keyword, and returning the searched website result to client module; client module judging whether the returned result includes valid phone number, if valid phone number included, client module displaying retrieved phone number, users perform subsequent operation on the displayed phone number; and if no valid phone number included, client module displaying prompting message to users, users restart operations of vague phone yellow page mode.

To achieve the purpose, the invention also provides a system for quickly retrieving information service on mobile terminal, comprising communication network, mobile terminal, and server connected to the internet; wherein the mobile terminal is bond with client module which includes the following function modules: configuration module for users to initialize various functions or methods of the module; communication module responsible for communication between client module and server; data managing module responsible for data of client module including users related service data and various website data initialized in client, and storage and retrieval of local data of phone numbers; monitor module responsible for monitoring key-operate of users, switching to corresponding service mode according to input of users; display module, for displaying different input interfaces to users with mobile phone desktop in different service modes, and displaying returned results of different operations; and online updating module responsible for online updating of client module, so as to obtain the newest function module and service module from server. The server including the following function parts: update supporting device responsible for realizing data update of client module; communication device responsible for realizing communication between server and client module; data managing device, responsible for storing and managing data of related business, for client module's data retrieval in the server database; and searching device, retrieving the internet on basis of the input information of client and returning related results.

The invention also provides a mobile terminal with function of quickly retrieving information service, which is bond with client module which includes the following function modules: configuration module for users to initialize various functions or methods of the module; communication module responsible for communication between client module and server; data managing module responsible for data of client module including users related service data and various website data initialized in client, and storage and retrieval of local data of phone numbers; monitor module responsible for monitoring key-operate of users, switching to corresponding service mode according to input of users; display module, for displaying different input interfaces to users with mobile phone desktop in different service modes, and displaying returned results of different operations. Besides the client module further includes online updating module which is responsible for online updating of client module, so as to obtain the newest function module and service module from server.

The invention also provides a storage medium, storing program codes for realizing functions of client module. The storage medium can be integrated in mobile terminal when manufacturing mobile terminal, also may be an outside storage medium connected with mobile terminal through a port.

The invention is a method and system for quickly retrieving information service on mobile terminal, which solves problems of current mobile phone desktop technology in rapid access to the internet, searching, vague phone querying and dialing, significantly simplifying operations of obtaining network services on mobile terminal, facilitating users to rapidly and conveniently access to the internet and WAP net from mobile terminal desktop, rapidly switching service modes and obtaining searching service, downloading information. The invention also provides a new method of rapidly and conveniently realizing communication services of vague phone yellow pages querying and directly dialing, greatly convenient for users. And operations of the invention are implemented on desktop and without remembering websites/ phone numbers, making operations of users' using mobile terminal simple, convenient and swift, improving users' feeling of using mobile phone. Thus the invention has a promising prospect.

DETAILED DESCRIPTION OF THE PREFERRED EMBODIMENTS

Figure 1:
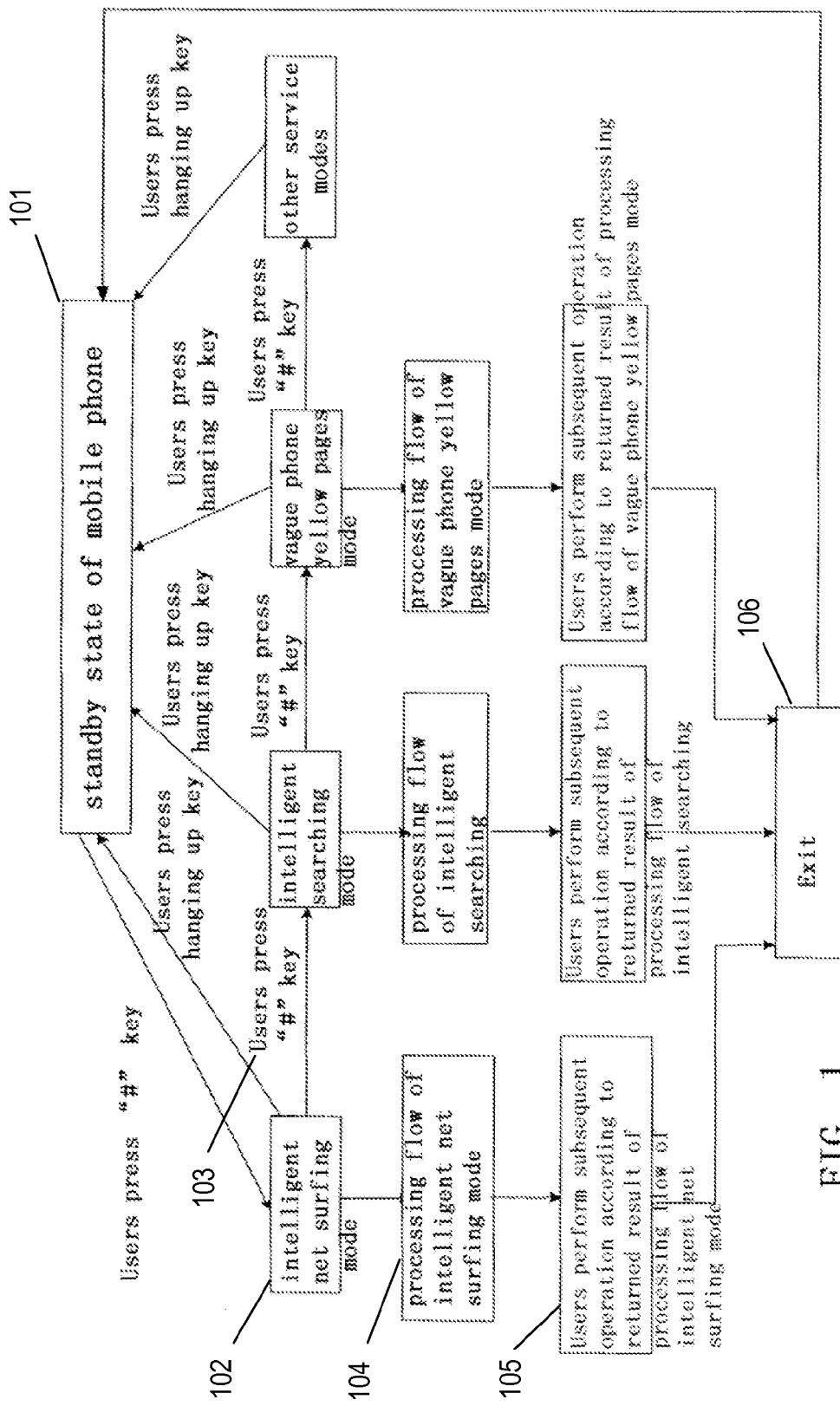
FIG. 1 is an operational flow schematic diagram of the method for quickly retrieving information service on mobile terminal of the invention.

To make purposes, technical solutions and advantages more clear, further detailed description of the invention will be made as follows in conjunction with the accompanying drawings.

The invention is a method for quickly retrieving information service on mobile terminal, which applies client/server system structure. Users directly interact with the server which is connected with the internet through a client module bond with mobile terminal, resulting users can make service modes switch quickly on mobile terminal desktop. In certain service mode, through mapping input keywords of users to corresponding services and content resources of wireless network, internet and telephone network, users can obtain information services simply, quickly and correctly; when mobile terminal is in standby state, users click mode switch key to change the standby state of mobile terminal to another preset service mode directly, or to switch between different service modes. And in a certain service mode, users directly input keywords on mobile terminal desktop, and according to current service mode and input information of users, by querying client database, server database or server searching device, the client module of mobile terminal obtains corresponding services and content resources of wireless network, internet and telephone network, and selects service vehicle which takes wireless network, internet and telephone network as network information according to service modes, directly introducing users into these network resources to obtain information services.

Mobile terminal of the invention includes mobile phone, personal digital assistant PDA, tablet, mobile internet device MID and personal handphone system (PHS). For sake of simplication, mobile phone is used to instead of mobile terminal in the following.

Service mode of the invention refers to current service mode of mobile phone, including accessing to WAP site and/or WEB site with mobile phone, searching and downloading contents, vague phone querying (i.e. a method of utilizing mobile phone and wireless network for users to obtain an unknown phone number which is related to keywords), mobile television (i.e. a method for users to choose and watch programs with mobile phone as receiving and playing terminal), mobile stock (a method for users to perform trade and operation of stocks and funds with mobile phone as operational vehicle), mobile payment (i.e. a method for users to pay for their consumed goods or services with mobile phone as operational vehicle), mobile blog (i.e. a method for users to skim, release, or respond to blogs with mobile phone as operation vehicle), mobile game (i.e. a method of playing games for users with mobile phone as operational platform and terminal), mobile music (i.e. a method for users to download and play audio files with mobile phone as downloading and playing terminal), mobile reading (i.e. a method for users to download and read e-book, e-periodicals and e-journal which are in the phone or on the internet or wireless network with mobile phone as storage and reading terminal) and mobile email (i.e. a method for users to receive, send, store, compile and transmit email with mobile phone as vehicle of receiving, storing, sending and compiling email).

Mode switch key refers to a key (which may be a separate function key specialized in the mobile phone and relates to the service mode, for example, special "net surfing mode key", "searching mode key", "vague phone querying mode key" etc, or may be the original key in the keyboard of the mobile phone which is endowed with related functions, for example "#" key or "*" key in the keyboard, or may be soft key displayed in screen; clicking the key makes the mobile phone switch between different modes for example from default standby mode to net surfing mode directly; pressing the key again makes the mobile phone switch to searching mode, the rest may be deduced by analogy—referring to FIG. 1) or keys combination (for example "1#" key and "2#" key respectively corresponds to net surfing mode and searching mode, the rest may be deduced by analogy) that users click to change standby state of waiting for dialing to a set certain service mode, or to switch between service modes. The operation of mode switch key can be implemented with keyboard of mobile phone, or with soft key displayed in screen, for example implemented with soft keyboard which is started in certain inputting mode. Mode switch key can also be extensively defined as a certain voice input instruction or handwriting input instruction.

Service starting key refers to a confirmation key users confirm to finish inputting information into client module and submit request in certain service mode, equivalent to "Enter" key in computer. The service starting key can be selected from dialing key, confirmation key, left key, right key or combination of certain keys, and also can be extensively defined as a certain voice input instruction or handwriting input instruction. For convenient description, dialing key is used to instead of service starting key. Service canceling key correspondingly set to service starting key refers to a key or keys combination users click to exist the service mode in certain service mode, which may be selected from hanging up key, right key, left key or combination of certain keys, also can be extensively defined as a certain voice input instruction or handwriting input instruction. For convenient description, hanging up key is used to instead of service canceling key.

Keywords of the invention refer to contents users directly input on mobile terminal desktop with a key, touch pen, or voice as evidence of providing information service in certain service mode. Speedy service code refers to a character string composed of number, letter, Chinese character or other symbols set initially by system or set by users, wherein each character string indicates users' certain inputting operation in certain service mode for directly starting corresponding module or device. For example in "intelligent net surfing mode", when users directly input speedy service code "2008", and click service starting key, querying database directly maps to its corresponding content, for example "www.beijing2008.cn", then browser is directly started, opening the official website of Beijing 2008 Olympic Games which is corresponding to the link address.

Information uploading method refers to the method with that client module of mobile terminal uploads input information of users to server, and information returning method refers to the method with that server processes the uploaded information of client module of mobile terminal and returns the obtained result to client. Information uploading/returning method includes internet connection (realized by various access ways including GPRS, EDGE, CDMA, 3G, etc.), SMS (Short Messaging Service), and MMS (Multimedia Messaging Service), which may set by users. The uploaded information of the invention refers to the information client module upload to server with information uploading method for the server to process, including input keywords of users, phone number, current selected service mode, current data matching mode, international mobile equipment identity IMEI, SIM card identity, international mobile subscriber identity (IMSI), cell identity of current location of mobile phone (CELL ID) and service region. The service region refers to the geographical range related to users' service mode, as a reference of processing input information of users, which may be a default setting of system or set by users. For example, if users set "service region" as "Beijing", when users perform vague phone querying in vague phone yellow pages mode, system will query related phone information in Beijing only.

Client database refers to the local database stored on mobile terminal, at least provided with five datasheets: basic information sheet, key word mapping sheet, speedy service codes mapping sheet, website mapping sheet, phone number mapping sheet, wherein contents of basic information sheet include: unit ID, unit name, profession identity, profession name, region identity, region name, and remarks; contents of keywords mapping sheet include: unit ID, and keywords; contents of speedy service codes mapping sheet include: identity, corresponding service mode, speedy service code, corresponding content of speedy service code, and remarks; contents of website mapping sheet include: unit ID, keywords, website name, and website address; contents of phone number mapping sheet include unit ID, keywords, phone name, and phone number. Server database is stored in server, which has the same or similar structure with client database, but with different contents. In client database the most frequently used information which occupies small space in stored to save storage space of mobile phone, and the data contents in the client database can be obtained from server for dynamically updating. In server database the information which is less used and occupies larger space than contents of client database is stored. Applying the data storage method of client database and server database can improve response speed to users' searching operation, reduce frequency of client module accessing to network, and save user's mobile internet traffic. Server searching device is a function component which takes input formation of users as input, and outputs returned results which match with currently selected service mode and satisfy users' request, with its searching range within internet and wireless network, the simplest structure and working style of which is to call existing searching engineer to retrieve particular keywords.

Client default searching website of the invention refers to various default searching websites directed by client when client starts browser for searching, including WAP site or WEB site of baidu, zhongsou, iask of sina, google, yahoo, etc., also can be a certain SMS searching platform (for example mingfo SMS searching platform, users send keywords through SMS to whose corresponding SMS service number, then mingfo sends back its searched results to client through SMS or other ways), or website specially set by users.

Network waiting information refers to the information client module displays to users when client module connects to server and waits for server to return results, or when client module starts local browser and waits for returned result. The information is downloaded in real time from server by client module during users' waiting period, or downloaded to client for temporarily keeping from server and can be dynamically updated when users are not using service, whose forms include character, picture, video, audio or FLASH, and whose contents include news of current political affairs, finance, entertainment, sports, society, technology, house property, education, tourist, military, legal system, cars, health, advertisements and other information.

Data matching mode of the invention can include two types: accurate matching and vague matching. In accurate matching, only the unique result which matches the input information of users in current service mode is returned in client database and/or server database and/or server searching device, here keywords input by users in current service mode are required to be uniquely identified by client module and/or server, otherwise client module gives prompt of not finding relevant results. In vague matching, client module or server may return several pieces of results which are related to the input keywords of users in current service mode, for selection of users, then go on next operation. For example in "intelligent net surfing" service mode, when users input "sina WAP", accurate matching only returns one result "3g.sina.com.cn", and vague matching may return several pieces of results related to users' input for users to select from the results and perform subsequent operation. For example in "intelligent net surfing" service mode, users input "sina", vague matching may return two results "3g.sina.com.cn" and www.sina.com.cn to users for selection.

The following table shows an example of basic information sheet:

| Unit ID | Unit Name | Profession Identity | Profession Name | Region Identity | Region Name |
|---|---|---|---|---|---|
| 1 | NetQin Mobile Inc. | 1 | IT | 1 | Beijing |
| 2 | SINA | 2 | internet | 1 | Beijing |
| 3 | CTRIP | 3 | tourist | 2 | Shanghai |
| 4 | ZJS Express | 4 | service | 1 | Beijing |
| 5 | Xu Jinglei | 0 | personal | 1 | Beijing |

The following table shows an example of keywords mapping sheet:

| Unit ID | Keywords |
|---|---|
| 1 | NetQin |
| 1 | NETQIN |
| 1 | mobile phone safety |

-continued

| Unit ID | Keywords |
|---|---|
| 1 | mobile phone virus |
| 1 | junk message |
| 1 | communication manager |
| 1 | mobile phone |
| 2 | SINA |
| 2 | SINA |
| 2 | news |
| 2 | military |
| 2 | finance |
| 2 | sports |
| 2 | technology |
| 2 | entertainment |
| 3 | CTRIP |
| 3 | tourist |
| 3 | travel |
| 3 | booking tickets |
| 3 | tickets |
| 3 | CTRIP |
| 3 | holiday |
| 3 | air tickets |
| 3 | hotel |
| 4 | express |
| 4 | ZJS |
| 4 | zjs |
| 5 | blog |
| 5 | BLOG |
| 5 | Xu Jinglei |
| 5 | Lao XU |

The following table shows an example of speedy service codes mapping sheet:

| Speedy Service ID Codes | Service Mode | Corresponding Contents | Remarks |
|---|---|---|---|
| 1 abc | intelligent net surfing | www.netqin.com | WEB site of NetQin |
| 2 123 | vague phone yellow pages | 01085656887 | service number of NetQin |

The following table shows an example of phone mapping sheet:

| Unit Id | Keywords | Phone Name | Phone Number |
|---|---|---|---|
| 1 | NetQin | service number of NetQin | 01085656887 |
| 1 | NetQin | business cooperation of NetQin | 01085656885 |
| 1 | NETQIN | service number of NetQin | 01085656887 |
| 1 | NETQIN | business cooperation of NetQin | 01085656885 |
| 1 | mobile phone safety | service number of NetQin | 01085656887 |
| 1 | mobile phone safety | business cooperation of NetQin | 01085656885 |
| 1 | mobile phone virus | service number of NetQin | 01085656887 |
| 1 | mobile phone virus | business cooperation of NetQin | 01085656885 |
| 1 | junk message | service number of NetQin | 01085656887 |
| 1 | junk message | business cooperation of NetQin | 01085656885 |
| 1 | mobile phone | service number of NetQin | 01085656887 |
| 1 | mobile phone | business cooperation of NetQin | 01085656885 |
| 2 | SINA | service number of Sina | 95105670 |
| 2 | SINA | advertisment service of Sina | 4008812813 |
| 2 | SINA | news hotline of Sina | 01082612286 |
| 2 | SINA | phone number of Sina | 95105670 |
| 2 | SINA | advertisment service of Sina | 4008812813 |
| 2 | SINA | news hotline of Sina | 01082612286 |
| 3 | CTRIP | booking phone of ctrip | 8008206666 |
| 3 | CTRIP | booking phone of ctrip (mobile phone) | 4008206666 |
| 3 | tourist | booking phone of ctrip | 8008206666 |
| 3 | tourist | booking phone of ctrip (mobile phone) | 4008206666 |
| 3 | travel | booking phone of ctrip | 8008206666 |
| 3 | travel | booking phone of ctrip (mobile phone) | 4008206666 |
| 3 | booking tickets | booking phone of ctrip | 8008206666 |
| 3 | booking tickets | booking phone of ctrip (mobile phone) | 4008206666 |
| 3 | tickets | booking phone of ctrip | 8008206666 |
| 3 | tickets | booking phone of ctrip (mobile phone) | 4008206666 |
| 3 | CTRIP | booking phone of ctrip | 8008206666 |
| 3 | CTRIP | booking phone of ctrip (mobile phone) | 4008206666 |
| 3 | holiday | booking phone of ctrip | 8008206666 |
| 3 | holiday | booking phone of ctrip (mobile phone) | 4008206666 |
| 3 | air tickets | booking phone of ctrip | 8008206666 |
| 3 | air tickets | booking phone of ctrip (mobile phone) | 4008206666 |
| 3 | hotel | booking phone of ctrip | 8008206666 |
| 3 | hotel | booking phone of ctrip (mobile phone) | 4008206666 |
| 4 | express | service hotline of ZJS | 4006789000 |
| 4 | ZJS | service hotline of ZJS | 4006789000 |
| 4 | zjs | service hotline of ZJS | 4006789000 |

The following table shows an example of website mapping sheet:

| Unit ID | Keywords | Website Name | Website Address |
|---|---|---|---|
| 1 | NetQin | home site of NetQin | wap.netqin.com |
| 1 | NETQIN | home site of NetQin | wap.netqin.com |
| 1 | mobile phone safety | home site of NetQin | wap.netqin.com |
| 1 | mobile phone virus | home site of NetQin | wap.netqin.com |
| 1 | junk message | home site of NetQin | wap.netqin.com |
| 1 | mobile phone | home site of NetQin | wap.netqin.com |
| 2 | SINA | sina site of mobile phone | 3g.sina.com.cn |
| 2 | SINA | sina site of mobile phone | 3g.sina.com.cn |
| 2 | news | Sina news | 3g.sina.com.cn |
| 2 | military | Sina military | 3g.sina.com.cn/3g/mil/index.php |
| 2 | finance | Sina finance | 3g.sina.com.cn/3g/finance/index.php |
| 2 | sports | Sina sports | 3g.sina.com.cn/3g/sports/index.php |
| 2 | technology | Sina technology | 3g.sina.com.cn/3g/tech/index.php |
| 2 | entertainment | Sina entertainment | 3g.sina.com.cn/3g/ent/index.php |
| 3 | CTRIP | Ctrip | www.ctrip.com |
| 3 | tourist | Ctrip | www.ctrip.com |
| 3 | travel | Ctrip | www.ctrip.com |

-continued

| Unit ID | Keywords | Website Name | Website Address |
|---|---|---|---|
| 3 | booking tickets | Ctrip | www.ctrip.com |
| 3 | tickets | Ctrip | www.ctrip.com |
| 3 | CTRIP | Ctrip | www.ctrip.com |
| 3 | holiday | Ctrip | www.ctrip.com |
| 3 | air tickets | Ctrip | www.ctrip.com |
| 3 | hotel | Ctrip | www.ctrip.com |
| 4 | express | home page of ZJS | www.zjs.com.cn |
| 4 | ZJS | home page of ZJS | www.zjs.com.cn |
| 4 | ZJS | home page of ZJS | www.zjs.com.cn |
| 5 | Xu Jinglei | blog of Xu Jinglei | http://v35.blog.sina.com.cn/xujinglei |
| 5 | blog | blog of Xu Jinglei | http://v36.blog.sina.com.cn/xujinglei |
| 5 | blog | blog of Xu Jinglei | http://v37.blog.sina.com.cn/xujinglei |
| 5 | Lao Xu | blog of Xu Jinglei | http://v38.blog.sina.com.cn/xujinglei |

Therefore, after inputting keywords on mobile phone desktop directly and clicking service starting key, concrete operations of client module of mobile phone according to current service and input information of users are:

First judging whether a set certain service can be directly started, if it can, users directly clicking service starting key to start corresponding information service (if input information of users is a legal phone name, client directly start dialing service); if the service cannot be directly started according to input keywords of users in current service mode, retrieving client database first to judge if related information can be queried, if it can, directly returning users the information, providing corresponding service to users; otherwise client module connecting with server, and uploading information to the server according to information uploading method, making the server to query server database; if related information queried, the queried result being returned to client module according to information returning method; otherwise, server starting server searching device to search and returning searched result to client module according to information returning method; client module obtaining related returned result and displaying it to users so that users perform subsequent operations and obtain related information services.

For example, operation procedures of the inventive method may be:

1) mobile terminal is in standby state;

2) when users clicks mode switch key, mobile terminal switches its standby state to preset intelligent net surfing mode or other preset service mode; at the moment, if users continue to press mode switch key, mobile terminal will be respectively switched to intelligent searching mode, vague phone yellow pages mode or other service mode in turn according to set sequences;

3) client module performs different processes according to input information of users and current service mode of mobile terminal, and returns processing results; and after mobile terminal enters into any service mode, when users click service cancelling key, the mobile terminal will return to standby state;

4) according to returned results processed by mobile terminal in current service mode, users perform subsequent operations, for example opening WAP site or WEB site, calling etc.;

5) after users implement related operations, mobile terminal exists from corresponding service mode, returning to standby state again.

Referring to FIG. 1, the operation flow of the inventive method is introduced in detail, listing three service modes: intelligent net surfing mode (initially set starting mode), intelligent searching mode and vague phone yellow pages mode in the figure.

(101) mobile phone is in standby state;

(102) when users click mode switch key: "#", mobile phone directly switches its standby state to set intelligent net surfing mode (or other service mode); and in any service mode, users click service cancelling key (hanging up key) to return to standby state;

(103) users click "#" key again can respectively switch to other service mode: intelligent searching mode, vague phone yellow pages mode or other service mode;

(104) in view of users' inputting mode, according to current service mode, client module performs different processing flow and returns results (for the processing flow of the three service mode will have a detailed description in the following);

(105) according to returned results processed in current service mode, users perform subsequent operations, for example opening WAP site or WEB site, calling etc.;

(106) after users implement related operations, mobile phone exists from corresponding programs (for example calling program or browser program), returning to standby state again.

The above is only an example of the invention, wherein users can originally set other start mode, and other mode switch keys, not limited to this description.

Figure 2:
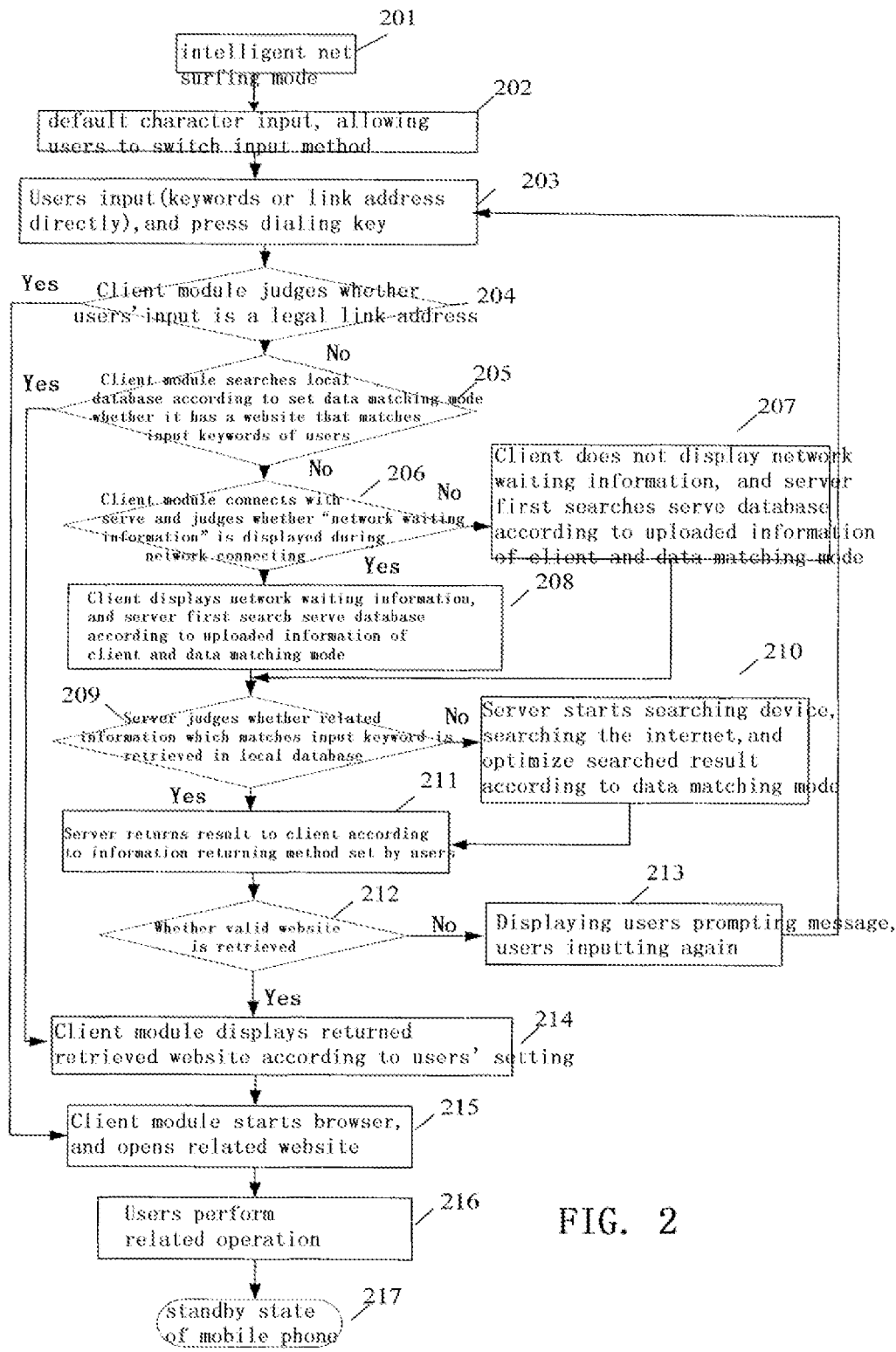
FIG. 2 is a process flow diagram of the invention in intelligent net surfing service mode.

Referring to FIG. 2, the processing flow after mobile phone switches to intelligent net surfing service mode is introduced:

(201) original state is intelligent net surfing service mode;

(202) mobile phone prompts users to select input method with default input method now as character input;

(203) users input keywords with key, touchpen or voice, with contents of input keywords including character string, combination of Chinese characters, number string, or character string composed of character, number and Chinese character, and click service starting key (dialing key);

(204) client module of mobile phone first judges whether input content of users is legal link address, if yes, it goes to step (215), otherwise, performing the subsequent operation;

(205) client module retrieves client database, for example searching results which match the input contents of users in intelligent net surfing service mode according to data matching mode set by users; first searching speedy service code corresponding to input contents, if it can be found, returning results directly; otherwise, searching whether having a website containing input contents of users as keywords, if corresponding result can be found, it goes to step (214); otherwise, performing the subsequent operation;

(206) client module uploads information to server according to information uploading method set by users; meanwhile, client module judges whether network waiting information is displayed during network connecting; if displayed, it goes to step (207); otherwise, performing the subsequent operation;

(207) client module doesn't display network waiting information; server queries server database according to client uploading information, and goes to step (209);

(208) client module displays network waiting information, server queries server database according to client uploading information;

(209) server judges whether related results can be retrieve in server database, if can, it goes to step (211), otherwise, performing the subsequent operation;

(210) server starts searching subsystem, searching with input contents of users as keywords, and optimizing returned results according to data matching mode; The following steps are optional: if searching subsystem also doesn't find related results, server gives prompting error message to prompt users to input keywords again;

(211) according to information returning method set by users, server returns searched result to client;

(212) client module judges whether the retrieved result is legal website, if it is legal, goes to step (214); otherwise, performing subsequent operation;

(213) client module displays prompting message to users, and after users perform inputting again, it goes to step (203), restarting operation of intelligent net surfing service mode;

(214) client module displays retrieved website according to users' setting for users' confirmation to open related website;

(215) client module starts browser, and opens corresponding website;

(216) users performs net surfing operation; When operation implemented, mobile terminal returns to standby state.

Figure 3:
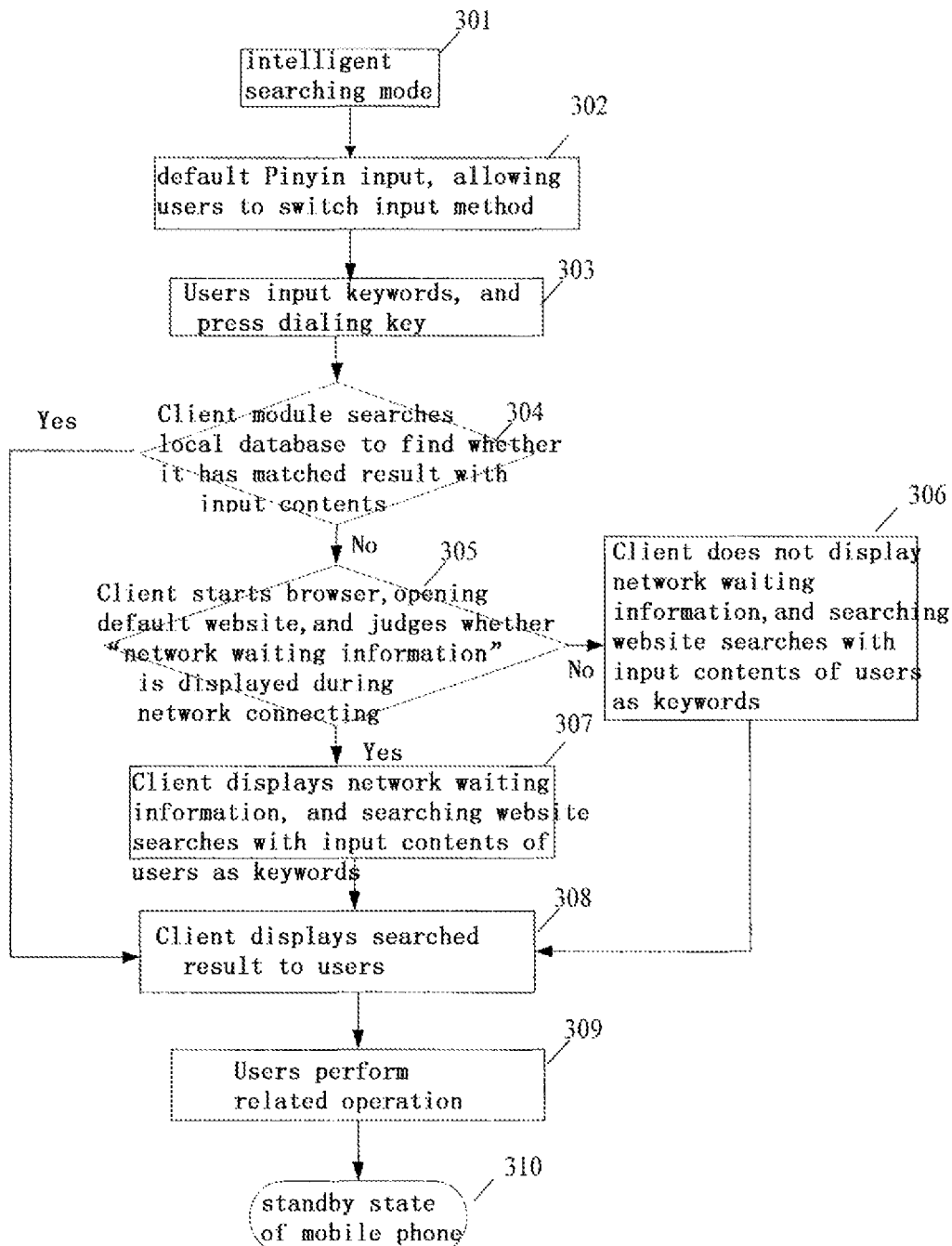
FIG. 3 is a process flow diagram of the invention in intelligent searching service mode.

Referring to FIG. 3, the processing flow after mobile phone switches to intelligent searching service mode is introduced:

(301) original state is intelligent searching service mode;

(302) mobile phone prompts users to select input method with default input method now as Chinese pinyin input;

(303) users input keywords with key, touchpen or voice, and click service starting key;

(304) client module of mobile phone first retrieves local database according to input keyword of users, and judge whether the input keyword of users is legal speedy service code, if is legal, client module can find content corresponding to the speedy service code; otherwise, client module retrieves local database to find whether there is content matches the input keyword of user; if related result retrieved, it goes to step (308); otherwise, performing the subsequent;

(305) client module starts browser, and opens default searching website of client module to search; If the default searching website of client is SMS searching platform, input information of users is sent to corresponding SMS special service number of SMS searching platform which searches according to input information of users; Meanwhile, client module judges whether network waiting information is displayed during network connecting, if displayed, it goes to step (307); otherwise, performing subsequent operation;

(306) client module doesn't display network waiting information, and after searching website retrieves with input content of users as keywords, it goes to step (308);

(307) client module displays network waiting information, searching website retrieves with input content of users as keywords;

(308) website or platform returns related searching result to client module through GPRS, SMS, WAP PUSH, MMS; Client module displays the searched result;

(309) users perform related operation according to the returned result; When users implement operation, mobile terminal returns to standby state.

Figure 4:
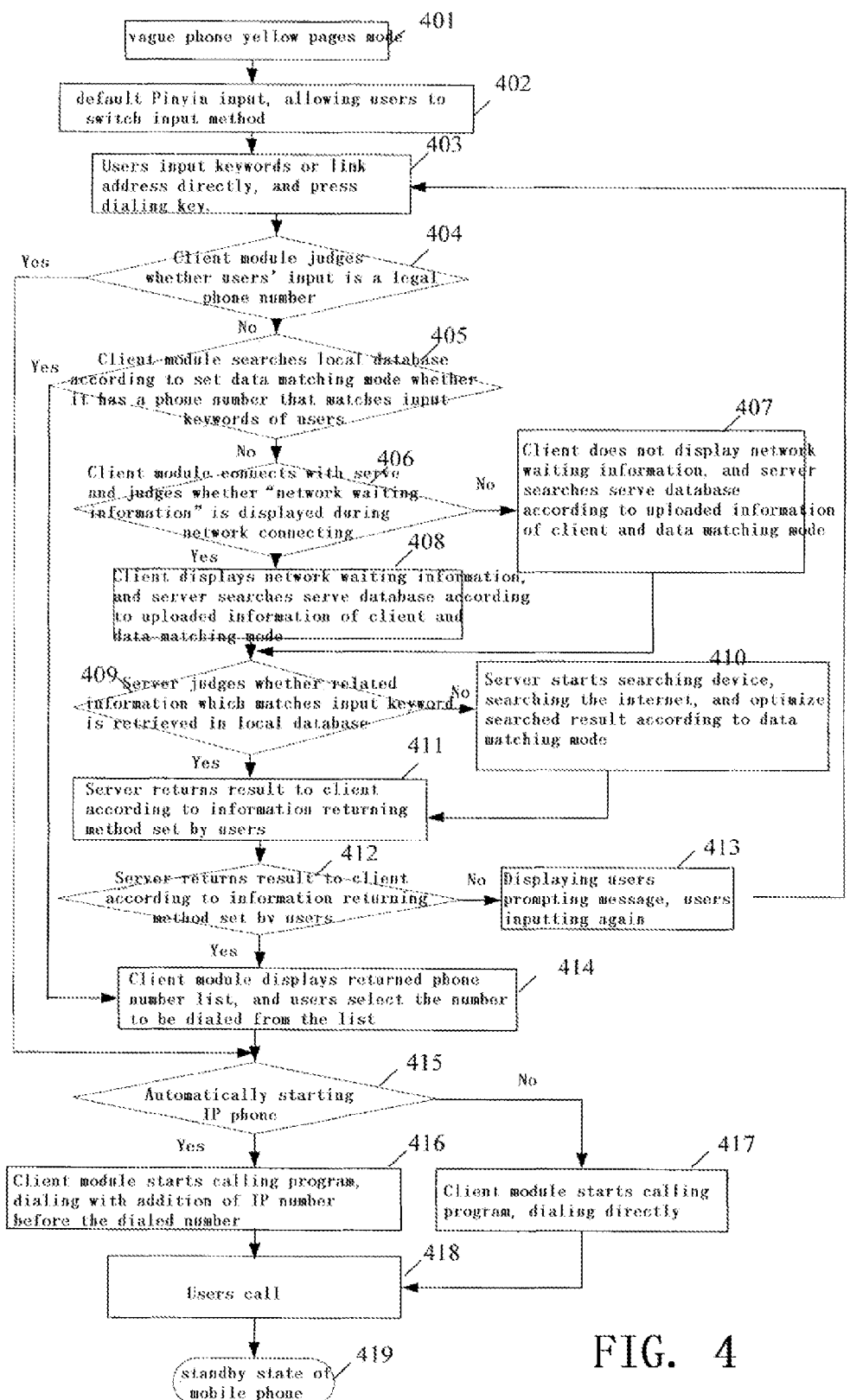
FIG. 4 is a process flow diagram of the invention in vague phone yellow pages service mode.

Referring to FIG. 4, the processing flow after mobile phone switches to vague phone yellow pages service mode is introduced:

(401) original state is vague phone yellow pages service mode;

(402) mobile phone prompts users to select input method with default input method now as Chinese pinyin input;

(403) users perform input operation with key, touchpen or voice, with input contents including letter string, Chinese character string, number string, or character string composed of letter, number and Chinese character, and click service starting key;

(404) client module of mobile phone first judges whether input content of users is a legal phone number, if yes, it goes to step (415), otherwise, performing the subsequent operation;

(405) client module retrieves local database, for example searching results which match the input contents of users in vague phone yellow pages service mode according to data matching mode set by users; if related result is retrieved in client database, it goes to step (414); otherwise, performing the subsequent operation;

(406) client module uploads information to server according to information uploading method set by users; meanwhile, client module judges whether network waiting information is displayed during network connecting; if displayed, it goes to step (408); otherwise, performing the subsequent operation;

(407) client module doesn't display network waiting information; after server queries server database according to uploaded information of client, it goes to step (409);

(408) client module displays network waiting information, and server queries server database according to uploaded information of client;

(409) server judges whether related results can be retrieved in server database, if can, it goes to step (411), otherwise, performing the subsequent operation;

(410) server starts searching device, searching the internet with input information of users as keywords, and optimizing returned results according to data matching mode; The following steps are optional: if searching device also doesn't find related results, server gives prompting message to prompt users to input keywords again;

(411) according to information returning method set by users, server returns searched result to client;

(412) client module judges whether the retrieved result is legal phone number, if it is legal, goes to step (414); otherwise, performing subsequent operation;

(413) client module displays prompting message to users, when users perform inputting again, it goes to step (403), restarting operation of vague phone yellow pages service mode;

(414) client module displays retrieved phone number according to users' setting for users' confirmation to dial the phone number;

(415) client module judges whether to automatically start IP dialing in current setting, if not, goes to step (417), otherwise, performing the subsequent operation;

(416) client module starts calling program, dialing automatically with addition of IP prefix number before the dialed phone number, so as to save phone expenses of users;

(417) client module automatically starts calling program, directly dialing with the phone number confirmed by users;

(418) users perform calling operation, when calling is over, mobile terminal returns to standby state.

The inventive method still includes operation of initializing client module of mobile phone. Each setting item in client module has a default, and all setting contents are optional. Users will not be affected even if they don't change any setting. Contents of initializing setting include: service mode valid after powering on, network connection point, mode switch key, service starting key, service canceling key, speedy service code, information uploading method, information returning method, data matching mode, whether or not automatically starting IP dialing, whether or not displaying network waiting information and default searching website of client browser.

Figure 5:
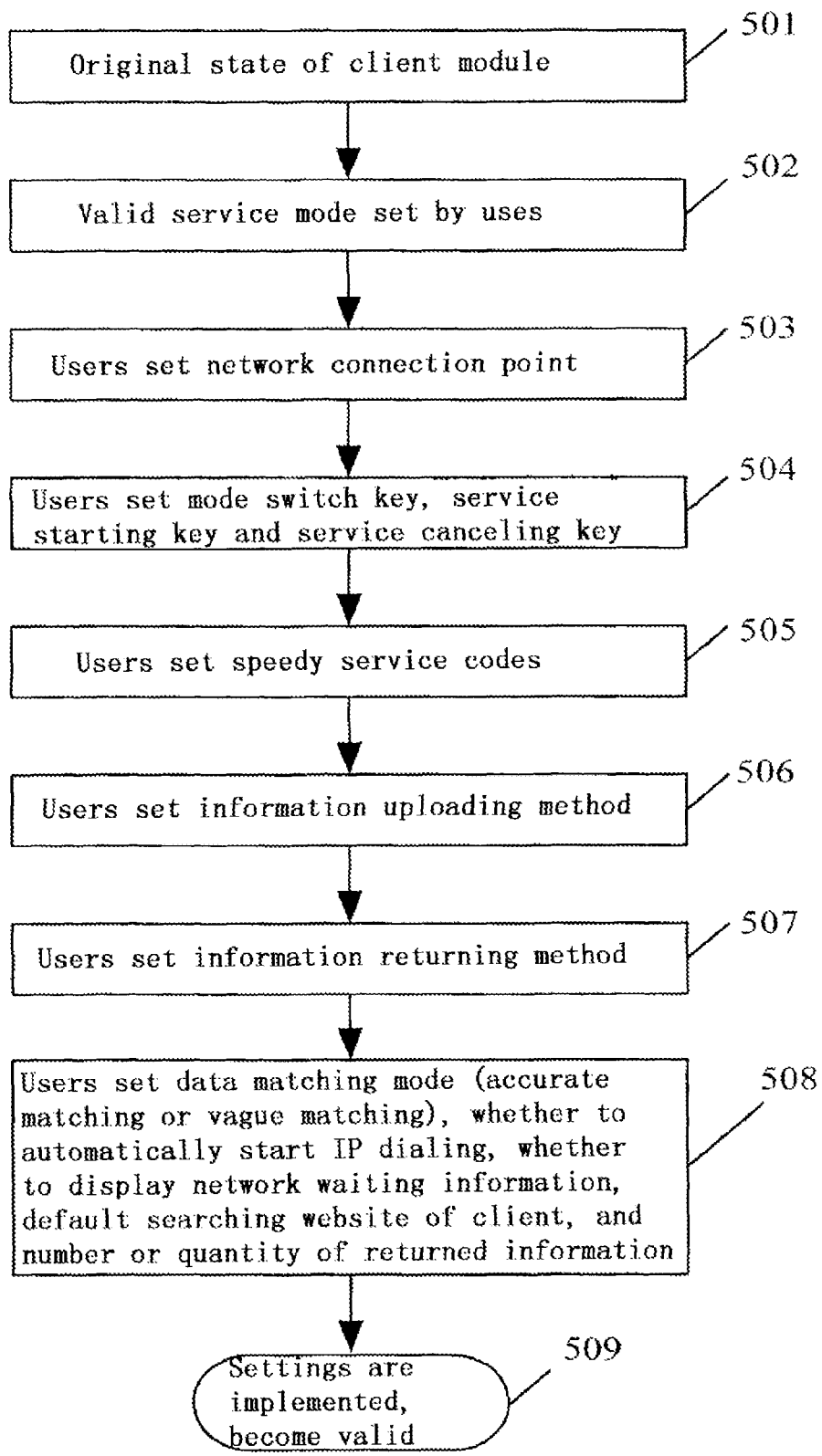
FIG. 5 is an operation flow schematic diagram of initializing client module of mobile terminal of the invention.

Referring to FIG. 5, concrete operational procedures of initializing setting of client module are as follows:

(501) client module initializes setting items;

(502) users set service mode valid after powering on, i.e. set certain service mode and close the other service modes so that when the mobile phone starts, it only enters into the service mode set by users as starting state;

(503) users set network connection point selected when connecting client module to server (for example CMNET or CMWAP);

(504) users set mode switch key, service starting key, service cancelling key or combination of keys, and correspondingly relate the mode switch key or combination of keys to different service modes;

(505) users set a speedy service code corresponding to a specific input in a preset certain service mode so that in the service mode users directly input speedy service code and click service starting key, directly entering into regions of providing corresponding information service;

(506) users set information uploading method from client to server and information returning method form server to client, including GPRS net connection, SMS and MMS;

(507) users set data matching mode applied in data querying: accurate matching or vague matching;

(508) users respectively set the following contents: default searching website of client, whether to automatically start IP dialing, whether to display network waiting information, and number or quantity of returned information, so to control network traffic or displaying effect of returned result in client;

(509) users implements settings, and new settings become valid.

Figure 6:
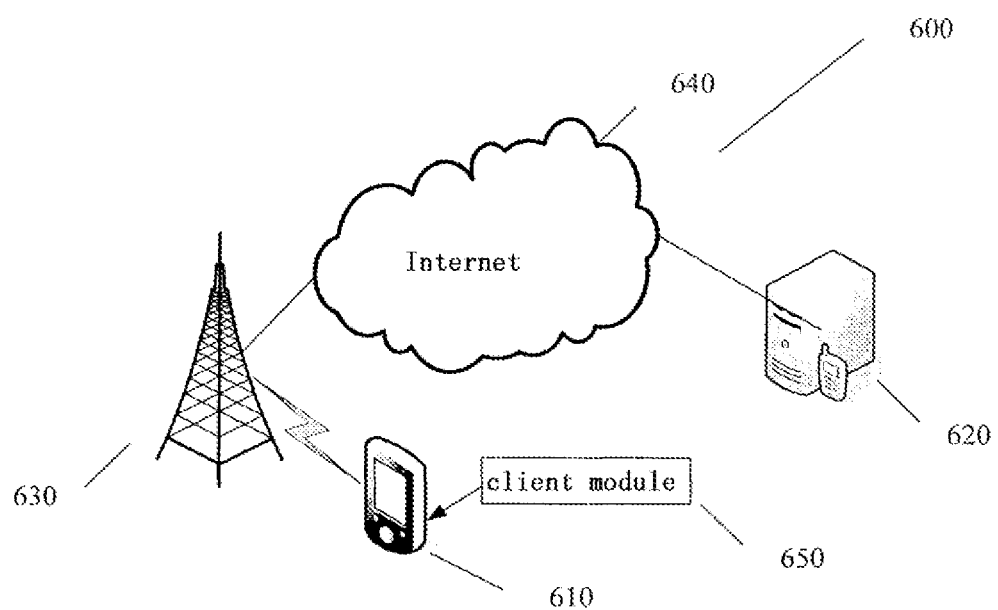
FIG. 6 is a schematic diagram of system for quickly retrieving information service on mobile terminal of the invention.

Referring to FIG. 6, component structure of the inventive system 600 for quickly retrieving information service on mobile terminal, including: wireless network, telephone network, wireless station 630, mobile terminal 610, and server 620 connected to internet 640; The system 600 is mainly characterized in: client module 650 (which may be developed by third party software developer or mobile phone manufacturer and realized in software or hardware method) for directly interacting with server to rapidly obtain information services binding to mobile terminal 610; application program of client module 650 operating on mobile terminal 610 which provides certain wireless connection method (for example GPRS) to the internet 640 through which server 620 communicates and interacts with mobile terminal 610.

Figure 7:
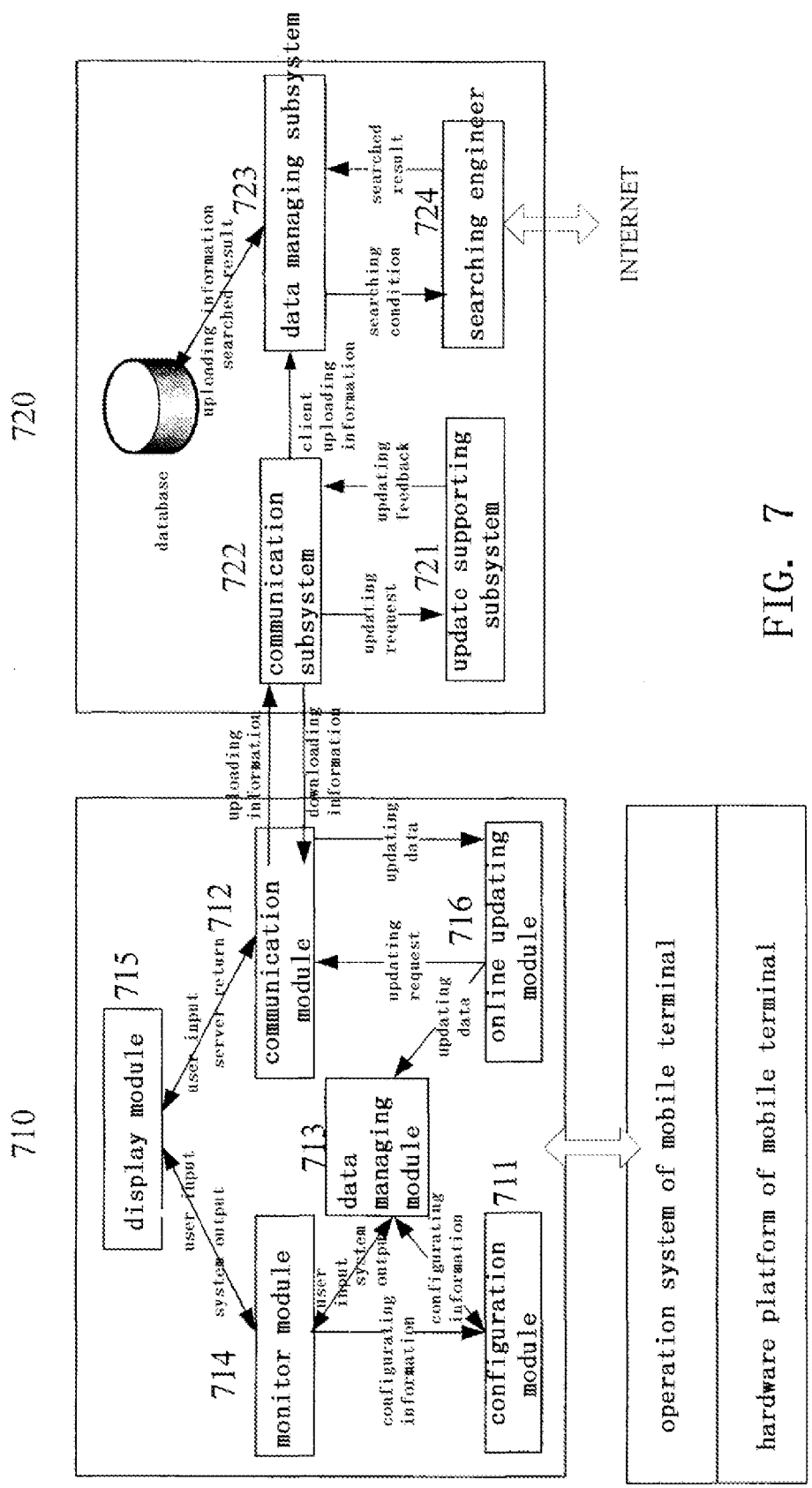
FIG. 7 is a structural schematic diagram of client module and server of mobile terminal of the invention.

Referring to FIG. 7, structural compositions of the inventive server 720 and mobile client module 710 are explained as follows:

Server 720 may be provided with the following function parts: update supporting device 721 responsible for realizing data update of client module, communication device 722 responsible for realizing communication between server and client module, data managing device 723 responsible for storing and managing data of related business, for example when client module cannot find corresponding data in local database, client module can retrieve data in the server database, and searching device 724 responsible for searching the internet on basis of the input information of client and returning related results, for example when client module 710 cannot obtain corresponding information in local database and data managing device 723 of server also cannot obtain retrieval result, searching device 724 will retrieve the internet according to input information of client, and returns related result.

Client module 710 can include the following function modules: configuration module 711 for user to initialize various functions or methods of the module; communication module 712 responsible for communication between client module and server; data managing module 713 responsible for data of client module including user related service data and various website datum initialized in client, and storage and retrieval of local datum of phone numbers; monitor module 714 responsible for monitoring key-operate of users, for switching to corresponding service mode according to input of user, and determines subsequent operation of system according to input content of users in current service mode; and display module 715 for displaying different input interfaces to user with mobile phone desktop in different service modes, and displaying returned results of different operations. Besides, client module 710 still includes online updating module responsible for updating client module online, so as to obtain the newest function module and service module form system supported by server.

Besides, the inventive embodiment also includes a mobile terminal having function of quickly retrieving information service, which binds to a client module including the following function modules: configuration module for user to initialize various functions or methods of the module; communication module responsible for communication between client module and server; data managing module responsible for data of client module including users related business data and various website datum initialized in client, and storage and retrieval of local data of phone numbers; monitor module responsible for monitoring key-operate of users, switching to corresponding service mode according to input of users; display module, for displaying different input interfaces to users with mobile phone desktop in different service modes, and displaying returned results of different operations. According to an improved embodiment of the embodiment, client module further includes online updating module which is responsible for online updating of client module, so as to obtain the newest function module and service module from server.

The invention has been tested, obtaining good experimental result, and the following briefly explain related operational flow displayed in screen of mobile phone when testing the invention.

Figure 8:
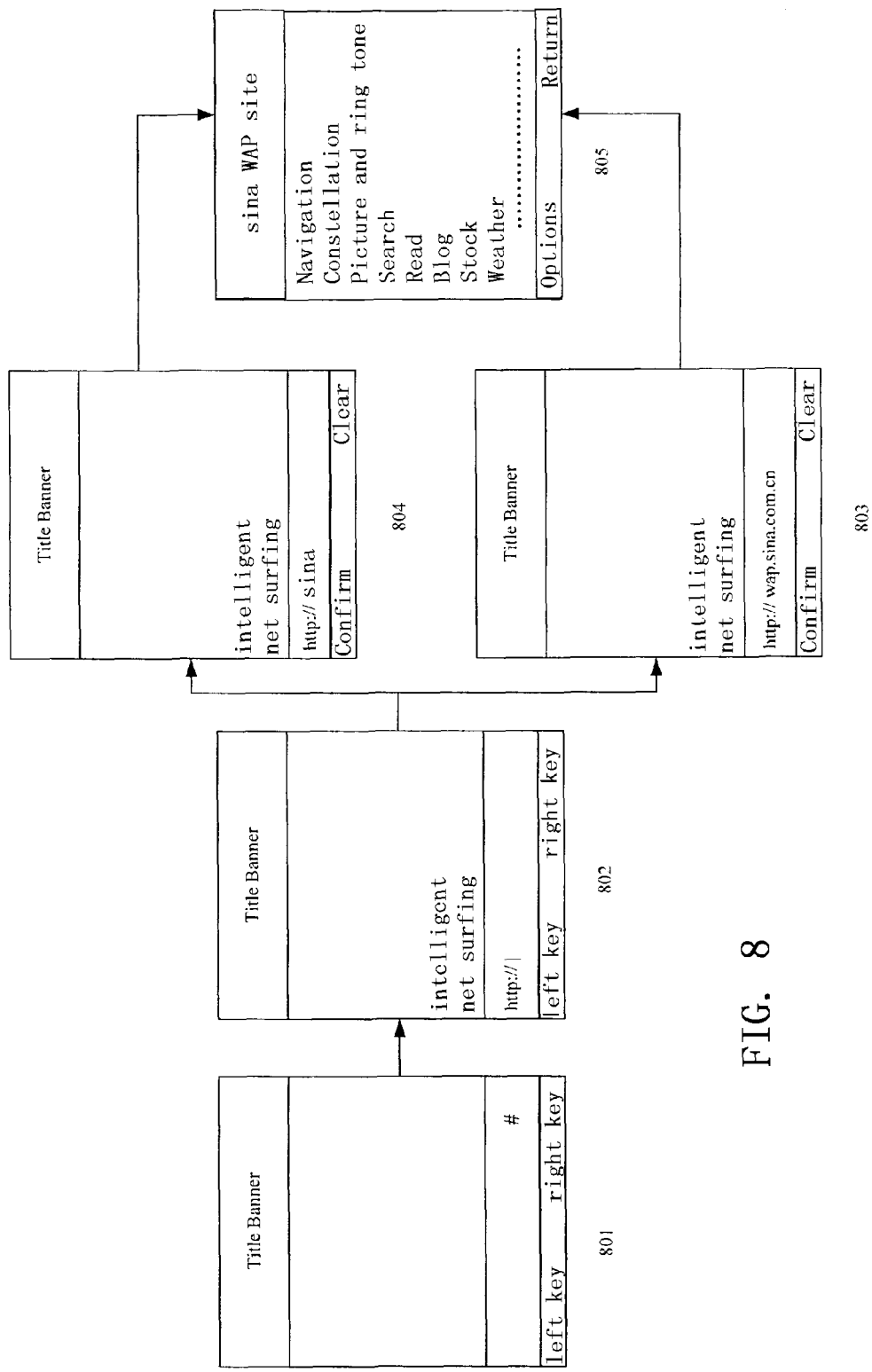
FIG. 8 is a schematic mobile phone desktop diagram of related operational flow of the invention embodiment in intelligent net surfing service mode.

Referring to FIG. 8, embodiment of client display screen of mobile phone with NOKIA N70 as an example in intelligent net surfing service mode is described as follows:

Step 801: users input "#" key on standby desktop of mobile phone;

Step 802: client module switches to "intelligent net surfing" service mode according to users' input, and displays corresponding input interface on desktop;

Step 803: users input wap site of sina in input interface and click dialing key for confirmation; or Step 804: users can also input "sina" in input interface directly and click dialing key for confirmation;

Step 805: client module directly starts browser, and opens page of sina WAP site.

Figure 9:
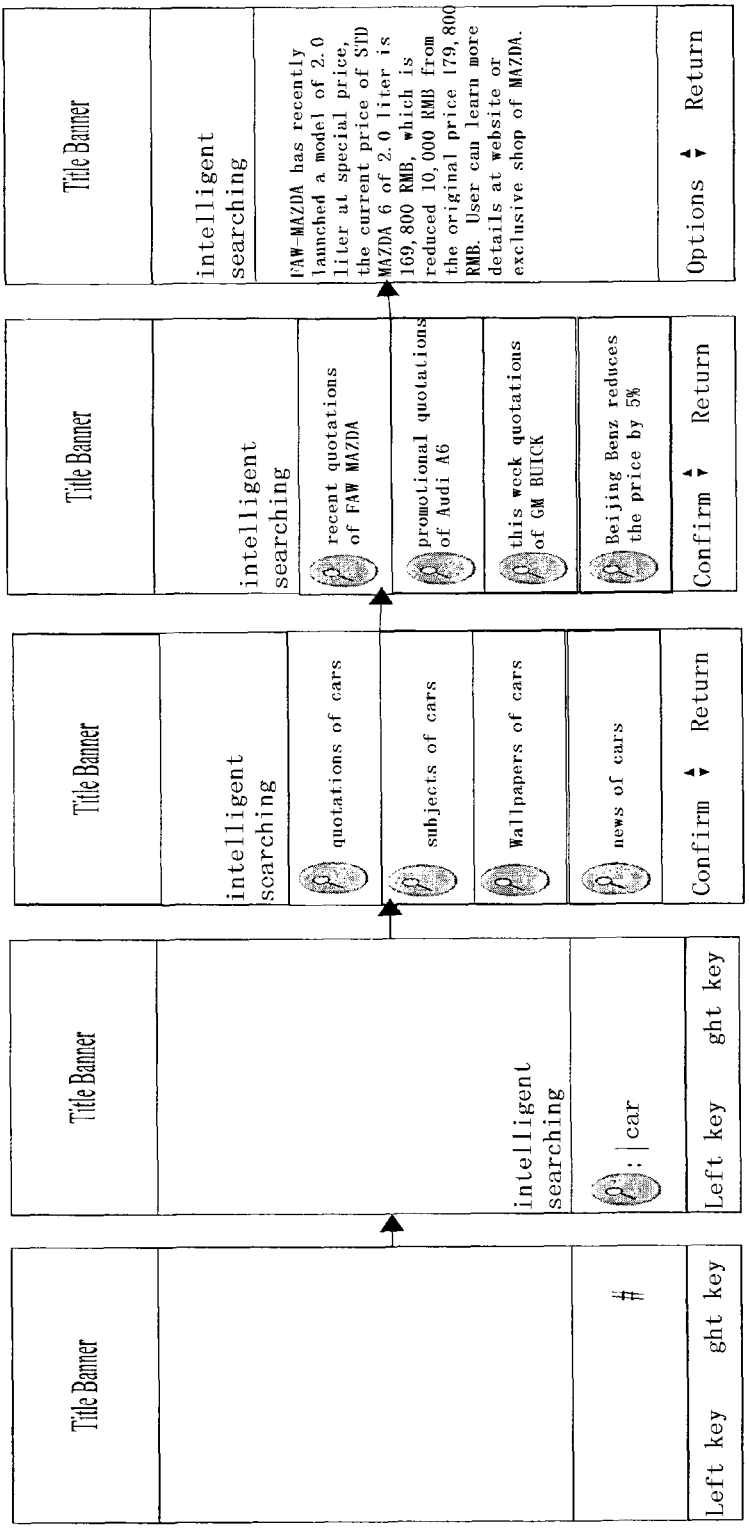
FIG. 9 is a schematic mobile phone desktop diagram of related operational flow of the invention embodiment in intelligent searching service mode.

Referring to FIG. 9, embodiment of client display screen of mobile phone with NOKIA N70 as an example in intelligent searching service mode is described as follows:

Step 901: users input "#" key on standby desktop;

Step 902: client module switches to "intelligent searching" service mode according to users' input, and displays corresponding input interface on desktop, again users input keyword: car, clicking dialing key to search;

Step 903: client module retrieves local database, if car-related data is retrieved in local database, it's displayed on desktop to users. Users continue to select "quotation of cars"

from returned results, and client continues to search with "quotation of cars" as keyword (if related result is not retrieved in local database, client connects to server so as to retrieve server database, and if still searching no related result, client starts searching device to search, and returns result to client.)

Step 904: client returns related information list with "quotation of cars" as keyword;

Step 905: users select one of returned results, click to open it and browse related contents.

Figure 10:
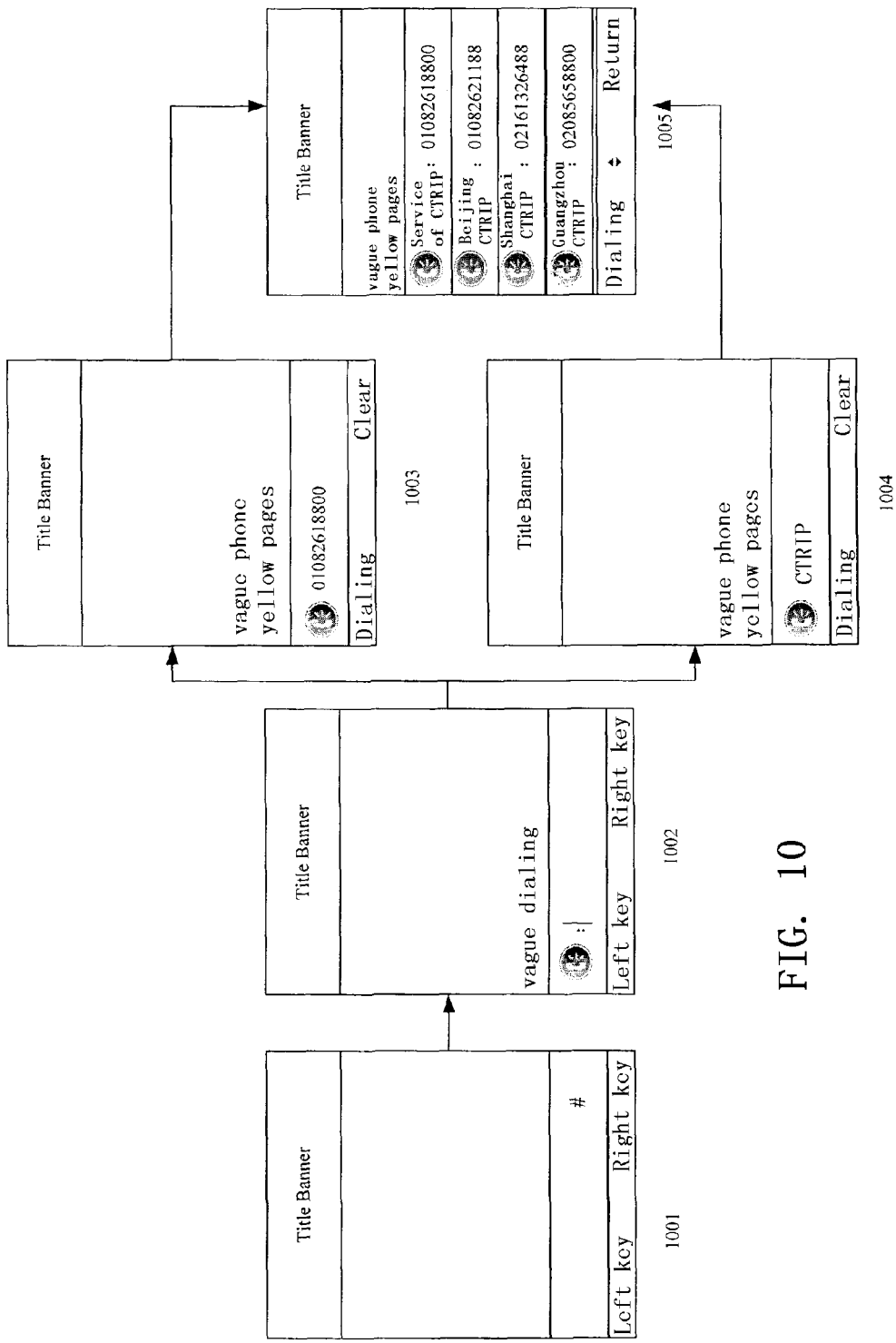
FIG. 10 is a schematic mobile phone desktop diagram of related operational flow of the invention embodiment in vague phone yellow pages mode.

Referring to FIG. 10, embodiment of client display screen of mobile phone with NOKIA N70 as an example in vague dialing service mode is described as follows:

Step 1001: users input "#" key on standby desktop;

Step 1002: client module switches to "vague phone yellow pages" service mode according to users' input, and displays corresponding input interface on desktop;

Step 1003: users input phone number directly in input interface and click dialing key for confirmation to dial directly;

Step 1004: users can also input "ctrip" in input interface directly and click confirmation key or dialing key for confirmation;

Step 1005: client module retrieves local database, if ctrip-related data is retrieved in local database, it's displayed on desktop to users. Users select one of returned results to dial (If related result is not retrieved in local database, client connects to server so as to retrieve server database, and if still searching no related result, client starts searching subsystem to search, and returns result to client).

Besides, embodiments within the inventive range also include a storage medium for carrying, or having program codes or data structures for realizing functions of the inventive client module. The like storage medium can be integrated into mobile terminal during manufacturing, and also can be an outside storage medium connected to mobile terminal through port.

The invention is described in conjunction with the accompanying drawings as before, but it should be understood for those skilled in the art, the invention is not limited to the detailed description, but also various modifications, equivalents and alternatives within the scope of the invention as defined by the appended claims. For example, in separate service mode, users can set whether to display network waiting information, searching website in intelligent searching mode can be other searching platforms except SMS searching platform, and whether to prompt to dial IP phone also can be set as requirement in vague phone yellow pages mode, etc. Therefore, the protection scope of the invention is defined within appended claims, not limited to the above specific embodiments.

What is claimed is:

1. A method of retrieving an information service on a mobile terminal, using a client/server system structure, and dependent on a service mode of the mobile terminal, the method comprising:
    obtaining, by a client module at a mobile terminal, information input by a user at the mobile terminal;
    determining, by the client module, if the information input by the user is a predetermined service code, wherein the predetermined service code is a character string corresponding to a service:
    if the information input by the user is a predetermined service code, providing, by the client module to the user, the service corresponding to the predetermined service code;
    if the information input by the user is not a predetermined service code, determining, by the client module, if the information input by the user corresponds to a record in a local client database;
    if the information input by the user corresponds to a record in the local client database, returning, by the client module, information from the record and providing, by the client module, a corresponding service to the user;
    if the information input by the user does not correspond to a record in the local client database, causing, by the client module, a server to query a server database using the information input by the user;
        if the server query finds a record associated with the information input by the user, sending, by the server, results from the server query to the client module to display to the user;
        if the server query does not find a record associated with the information input by the user, performing, by the server, a search on the internet using the information input by the user; and sending the search results to the client module to display to the user.

2. The method of claim 1, further comprising clicking, by the user, a mode switch key of the mobile terminal to directly switch between different service modes, the input information obtainable from the user being dependent on the service mode of the mobile terminal.

3. The method of claim 2, wherein the mode switch key comprises at least one of:
    a key of the keyboard of the mobile terminal;
    a soft key displayed on a screen of the mobile terminal;
    voice input instructions; and
    handwriting input instructions.

4. The method of claim 3, wherein
    the basic information sheet comprises the following fields: unit ID, unit name, profession identity, profession name, region identity, region name and remarks;
    the keywords mapping sheet comprises the following fields: unit ID and keywords;
    the speedy service codes mapping sheet comprises the following fields: identity, corresponding service mode, speedy service code, corresponding content of speedy service code and remark;
    the website mapping sheet comprises the following fields: unit ID, keywords, website name, website address; and
    the phone number mapping sheet comprises the following fields: unit ID, key words, phone name and phone number.

5. The method of claim 2, wherein the service modes between which the user can switch comprises:
    an intelligent net surfing service mode;
    an intelligent searching service mode;
    a vague phone yellow pages mode;
    a mobile television mode;
    a mobile stock mode;
    a mobile payment mode;
    a mobile blog mode;
    a mobile game mode;
    a mobile reading mode;
    a mobile music mode; and
    a mobile email mode.

6. The method of claim 1, wherein the local client database comprises the following datasheets:
    a basic information sheet;
    a keywords mapping sheet;
    a speedy service codes mapping sheet;
    a website mapping sheet; and
    a phone number mapping sheet;

wherein, the speedy service codes mapping sheet is searched first.

7. The method of claim 1, wherein data sent between the client module and the server is performed using one of:
an internet connection;
Short Message Service (SMS); and
Multimedia Messaging Service (MMS); and
the data comprises:
input keywords of users;
a phone number;
a current selected service mode;
a current data matching mode;
an international mobile equipment identity (IMEI);
a subscriber identity module (SIM) card identity;
an international mobile subscriber identity (IMSI);
a cell identity of a current location of the mobile phone; and
a service region.

8. The method of claim 1, further comprising initializing the client module.

9. A method of retrieving an information service on a mobile terminal in an intelligent net surfing service mode, the method comprising:
inputting information and clicking a service starting key at the mobile terminal, by a user;
determining, by the client module, if the information input by the user is a predetermined service code for the intelligent net surfing service mode, wherein the predetermined service code is a character string corresponding to a service;
if the information input by the user is a predetermined service code for the intelligent net surfing service mode, providing, by the client module to the user, the service corresponding to the predetermined service code;
if the information input by the user is not a predetermined service code for the intelligent net surfing service mode, determining, by a client module at the mobile terminal, if the information input by the user is a link address;
if the information input by the user is a link address, starting, by the client module, a browser and opening a website corresponding to the link address in the browser;
if the information input by the user is not a link address, determining, by the client module, if the information input by the user corresponds to a record in a local client database;
if the information input by the user corresponds to a record of the local client database, starting, by the client module, the browser and opening a website corresponding to a website link address stored in the record of the local client database;
if the information input by the user does not correspond to a record in the local client database, uploading the information to a server, by the client module, and causing the server to query a server database using the information;
if the information uploaded by the client module corresponds to a record of the server database, returning, by the server to the client module, a website link address stored in the record of the server database, and starting, by the client module, the browser and opening a website corresponding to the website link address returned by the server;
if the information uploaded by the client module does not correspond to a record of the server database, performing a search, by the server, using the information uploaded by the client module as a keyword;
if the search returns a related website link address to the server, sending, by the server to the client module, the website link address returned by the search and displaying, by the client module, the returned website link address, for user confirmation to open the related website;
if the search does not return a related website link address to the server, sending, by the server to the client module, a prompting message directing the user to input the information again.

10. The method of claim 9, wherein the client module displays network waiting information to the user.

11. The method of claim 9, further comprising optimizing the retrieved result or the searched result according to a data matching mode, the data matching mode comprising:
accurate matching in which only a unique result is returned which matches the information input by the user; and
vague matching, in which a plurality of results are returned which are related to the information input by the user.

12. A method of retrieving an information service on a mobile terminal in an intelligent searching service mode, the method comprising:
inputting information and clicking a service starting key at the mobile terminal, by a user;
determining, by the client module, if the information input by the user is a predetermined service code for the intelligent searching service mode, wherein the predetermined service code is a character string corresponding to a service;
if the information input by the user is a predetermined service code for the intelligent searching service mode, providing, by the client module to the user, the service corresponding to the predetermined service code;
if the information input by the user is not a predetermined service code for the intelligent searching service mode, determining, by a client module at the mobile terminal, if the information input by the user corresponds to a record in a local client database;
if the information input by the user corresponds to a record of the local client database, returning a website link address stored in the record of the local client database;
if the information input by the user does not correspond to a record in the local client database, performing a search, by the client module, using the information input by the user and returning a related website link address to the client module; and
displaying, by the client module, the search results.

13. The method of claim 12, wherein performing a search by the client module comprises sending, by the client module, the information input by the user to a searching website using Short Message Service (SMS), performing a search, by the searching website, and returning the search results, by the searching website to the client module, using SMS.

14. A method of retrieving an information service on a mobile terminal in a vague phone yellow pages mode, the method comprising:
inputting information and clicking a service starting key at the mobile terminal, by a user;
determining, by the client module, if the information input by the user is a predetermined service code for the vague phone yellow pages mode, wherein the predetermined service code is a character string corresponding to a service;
if the information input by the user is a predetermined service code for the vague phone yellow pages mode, providing, by the client module to the user, the service corresponding to the predetermined service code;

if the information input by the user is not a predetermined service code for the vague phone yellow pages mode, determining, by a client module at the mobile terminal, if the information input by the user is a valid phone number;

if the information input by the user is a valid phone number, directly dialing, by the client module, the phone number;

if the information input by the user is not a valid phone number, determining, by the client module, if the information input by the user corresponds to a record in a local client database;

if the information input by the user corresponds to a record of the local client database, returning, by the client module, information from the record; and displaying, by the client module, the returned information to the user;

if the information input by the user does not correspond to a record of the local client database, causing, by the client module, a server to query a server database using the information input by the user;

if the server query finds a record associated with the information input by the user, sending, by the server, results from the server query to the client module;

if the server query does not find a record associated with the information input by the user, performing, by the server, a search on the internet using the input information as a keyword, and sending the search results to the client module; and determining, by the client module whether the search results include a valid phone number;

if the search results include a valid phone number, displaying, by the client module to the user, the valid phone number; and if the search results do not include a valid phone number, displaying, by the client module to the user, a prompting message to restart operations.

15. The method of claim 14, further comprising requesting, by the client module, confirmation from the user to dial the valid phone number and dialing the valid phone number if confirmation is received from the user.

16. A system for retrieving information service on a mobile terminal, the system comprising:
   a communication network,
   a mobile terminal communicable with the communication network, and
   a server connected to the internet;
   wherein the mobile terminal comprises a client module which comprises:
      a configuration module for a user to initialize functions and methods of the client module;
      a communication module responsible for communication between the client module and the server;
      a data managing module responsible for data of the client module including user related service data and various website data initialized in the client module, and storage and retrieval of local datum of phone numbers;
      a monitor module responsible for monitoring user input, and switching between service modes dependent on input from the user;
      a user input module for receiving input from the user and determining if the information input by the user is a predetermined service code dependent on the service modes, wherein the predetermined service code is a character string corresponding to a service:
      a display module, for displaying input interfaces to the user in different service modes, and displaying returned results of operations; and
      an online updating module responsible for online updating of the client module, so as to obtain a newest function module and service module from the server;
   and wherein the server comprises:
      an update supporting device responsible for realizing a data update of the client module;
      a communication device responsible for realizing communication between the server and the client module;
      a data managing device, responsible for storing and managing data of a related business, for data retrieval in the server database; and
      a searching device, that searches the internet using information input by the user and returns related results.

* * * * *